Aug. 13, 1935.  P. E. SCHLEICHER  2,011,015
WIPER BLADE
Filed May 11, 1934
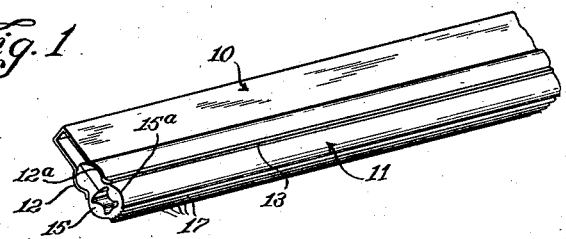
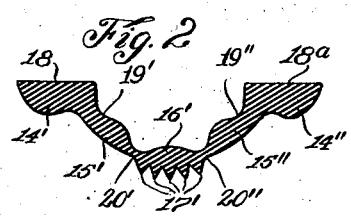 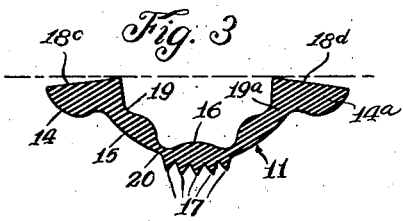
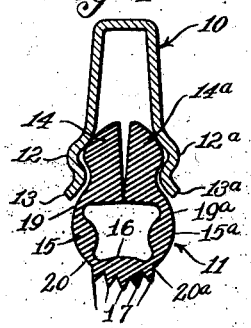 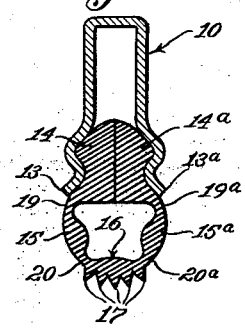 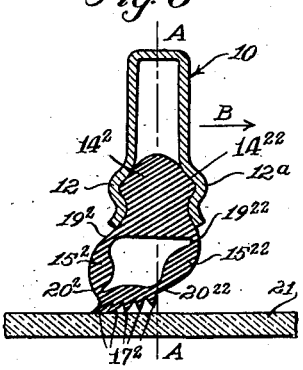
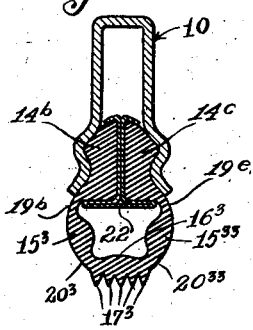 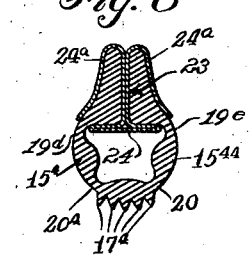
Inventor:
Paul E. Schleicher
By Jones, Addington, Ames & Seibold,
Attys.

Patented Aug. 13, 1935

2,011,015

UNITED STATES PATENT OFFICE 2,011,015

WIPER BLADE

Paul E. Schleicher, Gary, Ind.

Application May 11, 1934, Serial No. 725,027

11 Claims. (Cl. 15—245)

This invention relates to a wiper blade and has special reference to a device for cleaning the surface of a windshield of a motor vehicle in order that the driver and occupants thereof will have a clear and unobstructed field of vision.

More particularly, this invention relates to a wiper blade comprising a holder having spaced walls extending outwardly therefrom with a face bridging the walls at the outer ends thereof, the face being provided with wiping edges for contact with the surface of a windshield or the like to be cleaned and the walls being flexible or otherwise preferably adapted for movement such that the contact between the wiping edges and the surface are progressively increased from a leading edge.

The wiper blades of windshield cleaners both of the automatic and manual type each consists ordinarily of one or more strips of flexible material such as rubber clamped within a metal holder. The free edge of the flexible strip is relied upon for obtaining a wiping contact with the windshield glass, the holder being connected to a movable cleaner arm by a universal connection whereby the wiper blade and holder may flop over at the beginning of each stroke of the arm in either direction of travel for dragging the blade over the windshield glass or surface to be cleaned. In some instances, a plurality of stepped wiping edges are provided on a single strip and in other instances a plurality of strips are provided on each side of a centrally disposed strip in a stepped or graduated relation with the outermost strips the shortest, each strip providing an independently flexible edge. In order to obtain the advantage in use of a plurality of edges, the holder must incline in either direction toward the face and be pulled in the direction of movement of a movable wiper arm or the like to which the blade may be secured. Thus, it is necessary in such a construction to provide a universal connection between the holder and the movable arm.

In the present invention, the holder will occupy at all times a fixed angular relation with respect to the windshield or other surface to be cleaned and the universal movement of the holder ordinarily provided may be eliminated. In other words, the holder may occupy a position preferably at right angles to the surface to be wiped or cleaned during its complete movement.

In order to obtain the results desired in wiper blades of the present type, a plurality of edges are contemplated for contact with the article to be cleaned in either direction of movement of the wiper, the wiping edges in contact with the surface to be cleaned being pulled or dragged in either direction of movement by reason of the flexible connection between the walls of the wiper blade and the holder therefor. This flexibility is preferably provided by forming weakened portions in the walls of the blade to be employed as hinge or pivotal points. The face of the blade containing the individual wiping edges preferably bridges the converging side walls of the blade, the weakened portions being disposed adjacent the holder. Also, it may be desirable to provide such weakened portions likewise at the other end of the walls adjacent to the face.

In the provision of converging side walls with weakened portions disposed as aforesaid, the movement of the holder in one direction will cause a foreshortening of the leading side wall and an elongation of the following side wall so that the wiping edges on the face bridging the walls provide a progressively increased contact with the surface to be cleaned away from the leading edge. At all times a plurality of wiping edges will be in contact with the article to be cleaned and the wiping edges will be preferably in back of the central axis of the blade to eliminate chattering.

In the present construction, an expensive trimming operation is eliminated that heretofore has been necessary in constructions of the prior art. Also, in prior constructions it frequently happens that the glass engaging edge of the wiper blade becomes warped, or by improper displacement of the rubber in its holder the projecting edge will not be true and an absolute contact of the edges with the surface to be cleaned cannot be obtained. In the present construction, these details are not essential to be maintained.

One of the objects of this invention is to provide a wiper blade of the type hereinbefore referred to in which a progressively increased contact is had between the wiping edges of the blade and the surface to be cleaned.

Another object of this invention is to provide a wiper blade of the character above noted in which the walls of the blade have weakened portions to provide axes on which the walls may be pivoted to have a desired contact with the surface to be cleaned.

A still further object of this invention is to provide a wiper blade of the type noted above which is simple and comparatively inexpensive to manufacture, is highly efficient in operation, and is durable.

Other objects and advantages will hereinafter be more particularly pointed out and for a more complete understanding of the characteristic features of this invention, reference may now be had to the following description when taken together with the accompanying drawing, in which latter:

Figure 1 is a perspective view of a fragmentary portion of an assembled wiper blade incorporating the flexible strips of either Figs. 2 or 3;

Fig. 2 is a vertical sectional view of one form of flexible strip for use in a wiper blade in its normal condition out of the mold and prior to assembly in the holder;

Fig. 3 is a view similar to Fig. 2 of a modified form incorporating the features of this invention;

Fig. 4 is a central vertical sectional view of the flexible strip of Fig. 3 engaged by the holder just prior to assembly into final form;

Fig. 5 is a view similar to Fig. 4, showing the completed assembly of the strip of Fig. 3 and holder although the same view would disclose the completed assembly of the strip of Fig. 2 in its holder;

Fig. 6 is a view similar to Fig. 5, showing a modified form of strip in a changed position of the strip from that of Fig. 5 during the action of the wiper blade in passing over a surface to be cleaned;

Fig. 7 is a view similar to Fig. 5, showing a modified form of wiper blade construction as taught by the present invention;

Fig. 8 is a view similar to Fig. 7, showing a still further modified form of wiper blade construction illustrative of the present invention; and Fig. 9 is a view similar to Fig. 7 of another modified form of wiper blade construction as embodied in the present invention.

Referring now to the drawing, and more particularly to Figs. 1 to 6, inclusive, thereof, the device of this invention comprises a substantially rigid holder or backing strip 10 for supporting a flexible wiping strip 11, the holder being carried preferably on the free end of a manually or automatically operated wiping arm for movement over a windshield or other surface to be cleaned. The holder 10 is preferably of substantially channel-shaped cross section with the channel opening toward the windshield or other surface to be cleaned. The channel holder member is provided with oppositely disposed cooperating enlarged portions 12 and 12$^a$ with the outer ends thereof flared as at 13 and 13$^a$. The enlarged portions 12 of the channel member are of a size and shape preferably to conform to the outline of and clampingly engage a head portion formed by complementary enlargements 14 and 14$^a$ of the edges of the strips of flexible material forming the wiping element 11.

The wiping strip 11 of Figs. 3, 4 and 5 comprises spaced walls 15 and 15$^a$ extending outwardly from the complementary head portions 14 and 14$^a$ secured in the holder, a face 16 bridging the walls 15 and 15$^a$ at the outer ends thereof and being provided with a plurality of wiping edges 17, which latter contact with a surface to be cleaned.

The flexible wiping strip may be molded by placing a sheet of uncured rubber between male and female portions of a mold and applying sufficient pressure thereto to compress the rubber to a desired thickness, whereafter the mold may be subjected to heat to cure the blank and cause it to retain that form and shape imparted to it by the molding process. Otherwise the wiping element may be extruded in the usual manner, the molding operation necessitating a folding of the material with a subsequent clamping of the meeting edges; whereas, the extruded strip is formed in a completed state.

By referring particularly to Fig. 2 wherein the same numerals are used as in Fig. 3 although with changed exponents to refer to corresponding elements, the molded type of construction is shown in which the flexible element is in the form of a strip. The flexible strips are preferably cut from a sheet comprising a substantial number of strips and may either be cut to length or formed of a desired length in the mold. In the embodiment illustrated in Fig. 2, the horizontally extending edges 18 and 18$^a$ are the edges which abut to form complementary head portions 14' and 14" which are clamped by the backing strip. In the embodiment shown in Fig. 3, the corresponding abutting surfaces 18$^c$ and 18$^d$ are tapered with respect to the horizontal for purposes which will hereinafter be more fully explained.

The outwardly extending side walls 15 and 15$^a$ are preferably provided with weakened portions 19 and 19$^a$ adjacent the outer flared ends 13 of the backing strip or holder. These weakened portions provide hinges or axes on which the walls may be said to pivot. Also, the outwardly extending side walls 15 and 15$^a$ are preferably provided with weakened portions 20 and 20$^a$ adjacent the face 16 for the purpose of providing hinges or axes for pivotal movement of the face with respect to the side walls. These weakened portions may be molded or otherwise formed so as to provide a reduced thickness of material at those portions as compared to the thickness prevailing generally throughout the strip.

It will be particularly noted that the internal opening provided by the side walls and face of the strip when in an assembled relation to the holder is of isosceles trapezoid form with the larger base portion thereof formed by the bases of the complementary heads. Or it may be said that the spaced side walls extend in a direction to converge outwardly from the holder. By reason of the side walls converging in this manner, a progressively increased contact may be had between the wiping edges 17 and the surface to be cleaned which, by referring to Fig. 6 of the drawing, may be the windshield glass 21.

The holder 10 is preferably for connection with a movable arm mounted on a windshield for cleaning the surface of the windshield whereby the driver will have a clear and unobstructed field of vision. In such a case there is a pressure on the holder in the direction of the surface to be cleaned. The wiper blade may, of course, be manually applied to a surface in the same manner but for purposes of illustration the wiper blade is shown and is described in connection with a movable arm for a windshield cleaner. Sufficient pressure, therefore, is brought to bear on the holder and assembled flexible element to obtain a good cleaning contact with the surface of the glass.

The holder 10 is mounted in such a manner that its lateral central axis represented by the broken line A—A is held at a fixed or constant angle with respect to the surface of the glass to be cleaned although movable with respect thereto in a direction across the surface of the glass. When the holder is moved in the direction of the arrow B in Fig. 6 wherein the same numerals are employed as in the other figures although with different exponents to indicate similar elements, the plurality of wiping edges are brought to bear against the surface of the glass to be cleaned and the frictional contact therebetween causes the wiping edges to drag behind the holder due to the weakened portions $19^2$, $19^{22}$ and $20^2$, $20^{22}$, the side walls $15^2$ and $15^{22}$ pivoting upon the weakened portions as axes. The side walls $15^2$ and $15^{22}$ extending normally in a converging relation directly outwardly from the holder will assume new positions during the movement of the holder, the trailing side wall $15^2$ assuming a substantially perpendicular relation with the surface to be cleaned and the leading side wall $15^{22}$ assuming a substantial inclination with the surface. Thus, the wiping edges $17^2$ will have a progressively increased contact with the surface to be cleaned in a direction away from the leading wiping edge, the leading edge being either in very slight contact with the glass or having no contact therewith while the remaining edges progressively form a very slight contact to a contact at the major rubbing edge or edges such as to distort the edges. The drawing is of course, an exaggerated showing for purposes of clarity of illustration.

As soon as the wiper blade including the holder and the assembled strip reaches the limit of movement in one direction, a reversal of the direction of movement will cause the flexible strip to likewise reverse its position such that the previously described leading edge becomes a major rubbing edge and the previously described major rubbing edge becomes a leading edge. It is preferable that the wiping edges in actual contact with the surface to be cleaned drag behind the axis A—A in either direction of movement of the arm to substantially eliminate chattering.

Fig. 4 shows the strip of Fig. 3 in an assembled relation ready to be clamped by the holder. It will be noted that the material of the complementary head portions abuts along one pair of edges of the abutting sides $18^c$ and $18^d$ and are separated at the other edges thereof. In this form, when the holder clamps the complementary head portions in an assembled relation, such as is shown in Fig. 5, the hinge portions $19$ and $19^a$ are backed by a substantially compressed portion of the head. The provision of the inclined portions $18^c$ and $18^d$, therefore, act more or less in the capacity of a reinforcement for the hinged portions of the side walls to maintain a fixed spaced relation. However, it may be desirable that the contacting surface may be uniformly compressed as by means of providing the surfaces $18$ and $18^a$ in a horizontal condition. The assembly of either of these embodiments shown in Figs. 2 and 3 is shown in Fig. 5. Fig. 6 shows an embodiment that has been extruded and, therefore, a vertically and centrally disposed meeting edge is not seen in the drawing.

In order to avoid repetition of description, the same reference numerals are employed in Figs. 7, 8 and 9, as in the previously described figures, to indicate similar elements for effecting the same results in the same manner although the numerals are given different exponents for each figure. Referring now more particularly to Fig. 7, a modified form of construction is shown wherein the complementary head portions $14^b$ and $14^c$ are reinforced by a metallic strip formed in the shape of a T in cross section, the head $22$ of the T-shaped strip backing up the hinged portions $19^b$ and $19^c$ in the same manner contemplated in Fig. 4 by the provision of a surplus of material at the one edge of the contacting surfaces. In Fig. 8 the metallic strip $23$ has a head $24$ for backing up the hinged portions $19^b$ and $19^c$ in the same manner as that previously described in connection with Fig. 7, although the metallic strip is bent over to provide a rigid backing strip $24^a$ for the flexible wiping strip to obviate the necessity of providing a separately formed holder.

Referring now more particularly to Fig. 9, the flexible wiping strip $25$ is shown as being of a substantially uniform thickness throughout, the weakened portions $19^f$ and $19^g$ being cut in the flexible strip rather than being molded therein. This is merely a variance in form and operates in the same manner as the strip previously described in connection with the other embodiments.

It is to be further pointed out that the wiping edges $17$ may be formed in an arcuate plane, as shown in Figs. 4, 5, 6 and 8 or may be formed in a straight line as shown in Figs. 7 and 9. In the arcuate formation of the wiping edges, the pressure applied to the arm in a direction against the wiping surface compresses the flexible members in such a manner that all of the wiping edges contact with the glass in the same manner that they do where the wiping edges are disposed in a straight line. However, it may be desirable to form the wiping edges in either an arcuate plane or a straight plane and both forms have thus been shown.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. An elongated wiper unit adapted to be moved transversely of its length and pressed against a surface to be wiped comprising an elongated blade forming in cross-section a four bar linkage having side wall links articulated to a substantially rigid holder outlining the base link and the opposite side constituting a wiping surface link having a yieldable surface, said base link portion being longer than the wiping link and the leading edge of said base link in a normal position being ahead of the leading edge of the wiping link in the direction of motion, said side wall link leading in the direction of motion being equal or shorter than said trailing side wall link whereby to provide a progressively increased pressure on said surface to be wiped in a direction opposite to and during the movement of said blade, and resilient means for opposing relative movement of said links and for tending to maintain the normal position thereof.

2. An elongated wiper unit adapted to be moved transversely of its length and pressed againt a surface to be wiped comprising an elongated blade forming a hollow member having side walls articulated between a substantially rigid holder outlining the base and the opposite side constituting a wiping wall having a yieldable surface, said side walls each having hinge portions adjacent said wiping surface and base, the distance between said hinge portions adjacent said base being greater than the distance between said hinge portions adjacent said wiping surface and the leading edge of said base in a normal position being ahead of the leading edge of the wiping surface in the direction of motion, and resilient means for opposing relative movement of said links and for tending to maintain the normal position thereof.

3. An elongated wiper unit adapted to be moved transversely of its length and pressed against a surface to be wiped comprising an elongated resilient and yieldable blade forming a hollow member having side walls fixed between a substantially rigid holder outlining the base and the opposite side constituting a wiping surface of appreciable width substantially parallel thereto in normal resiliently held position, said side walls each having weakened portions adjacent said wiping surface and said base to form hinges, the distance between said hinge portions adjacent said base being greater than the distance between said hinge portions adjacent said wiping surface, and said side wall leading in the direction of motion being equal to or shorter than the trailing side wall.

4. An elongated wiper unit adapted to be moved transversely of its length and pressed against a surface to be wiped comprising an elongated blade forming a hollow member having side walls articulated between a substantially rigid holder outlining the base and the opposite side constituting a wiping wall having a yieldable surface, said side walls each having hinges adjacent said wiping surface and said base, the distance between said hinge portions adjacent said base being greater than the distance between said hinge portions adjacent said wiping surface and the leading edge of said base in a normal position being ahead of the leading edge of the wiping surface in the direction of motion, and resilient means for opposing relative movement of said links and for tending to maintain the normal position thereof.

5. An elongated wiper unit adapted to be moved transversely of its length and pressed against a surface to be wiped comprising an elongated blade forming a hollow member having side walls articulated between a substantially rigid holder outlining the base and the opposite side constituting a wiping wall having a yieldable surface, said side walls each being of non-uniform thickness to provide weakened portions adjacent said wiping surface and said base to form hinges, the distance between said hinge portions adjacent said base being greater than the distance between said hinge portions adjacent said wiping surface and the leading edge of said base in a normal position being ahead of the leading edge of the wiping surface in the direction of motion, and resilient means for opposing relative movement of said links and for tending to maintain the normal position thereof.

6. An elongated wiper unit adapted to be moved transversely of its length and pressed against a surface to be wiped comprising a strip of flexible and resilient material in a single piece folded to provide a hollow member having abutting clamped portions forming the base thereof and having side walls between said base and the side opposite said base constituting a wiping surface, said side walls each having hinge portions adjacent said wiping surface and said base, the distance between said hinge portions adjacent said base being greater than the distance between said hinge portions adjacent said wiping surface and the leading edge of said base in a normal position being ahead of the leading edge of the wiping surface in the direction of motion, and resilient means for opposing relative movement of said links and for tending to maintain the normal position thereof.

7. An elongated wiper unit adapted to be moved transversely of its length and pressed against a surface to be wiped comprising a strip of flexible and resilient material in a single piece folded to provide a hollow member having abutting clamped portions forming the base thereof and having side walls between said base and the side opposite said base constituting a wiping surface, said base being reenforced adjacent said hinge portions and said side walls each having hinge portions adjacent said wiping surface and said base, the distance between said hinge portions adjacent said base being greater than the distance between said hinge portions adjacent said wiping surface and the leading edge of said base in a normal position being ahead of the leading edge of the wiping surface in the direction of motion, and resilient means for opposing relative movement of said links and for tending to maintain the normal position thereof.

8. An elongated wiper unit adapted to be moved transversely of its length and pressed against a surface to be wiped comprising a strip of flexible and resilient material in a single piece folded to provide a hollow member having abutting clamped portions forming the base thereof and having side walls between said base and the side opposite said base constituting a wiping surface, and a substantially rigid reenforcing strip extending across said clamped portions, said side walls each having hinge portions adjacent said wiping surface and said base, the distance between said hinge portions adjacent said base being greater than the distance between said hinge portions adjacent said wiping surface and the leading edge of said base in a normal position being ahead of the leading edge of the wiping surface in the direction of motion, and resilient means for opposing relative movement of said links and for tending to maintain the normal position thereof.

9. An elongated wiper unit adapted to be moved transversely of its length and pressed against a surface to be wiped comprising an elongated blade forming a hollow member having side walls articulated between a substantially rigid holder outlining the base and the opposite side constituting a wiping wall having a yieldable surface, said side walls each having hinge portions adjacent said wiping surface and base, the distance between said hinge portions adjacent said base being greater than the distance between said hinge portions adjacent said wiping surface and the leading edge of said base in a normal position being ahead of the leading edge of the wiping surface in the direction of motion, means for positively maintaining the position of said hinge portions adjacent said base, and resilient means for opposing relative movement of said links and for tending to maintain the normal position thereof.

10. An elongated wiper unit adapted to be moved transversely of its length and pressed against a surface to be wiped comprising an elongated blade of rubber forming a hollow member having side walls fixed between a substantially rigid holder outlining the base and the opposite side constituting a wiping surface, said side walls each having weakened portions adjacent said wiping surface and said base to form hinges, the distance between said hinge portions adjacent said base being greater than the distance between said hinge portions adjacent said wiping surface and the leading edge of said base in a normal position being ahead of the leading edge of the wiping surface in the direction of motion.

11. An elongated wiper unit adapted to be moved transversely of its length and pressed against a surface to be wiped comprising an elongated blade forming in cross-section a four bar linkage having side wall links articulated to a substantially rigid holder outlining the base link and the opposite side constituting a wiping surface link having a yieldable surface, said base link portion being longer than the wiping link and the leading edge of said base link in a normal position being ahead of the leading edge of the wiping link in the direction of motion, and resilient means for opposing relative movement of said links and for tending to maintain the normal position thereof.

PAUL E. SCHLEICHER.